C. P. WAGNER.
FLOUR SPRINKLER.
APPLICATION FILED FEB. 12, 1914.
1,128,559.
Patented Feb. 16, 1915.
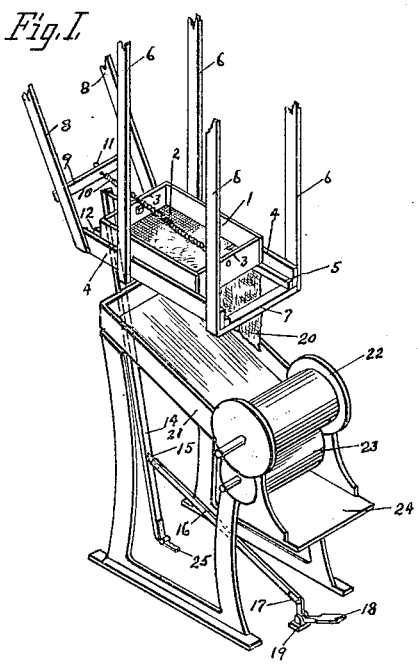
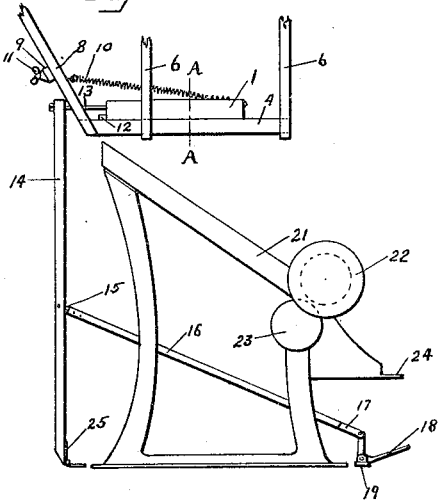
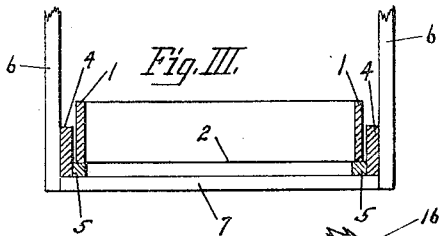
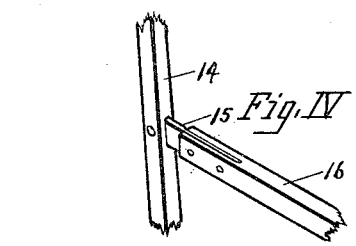
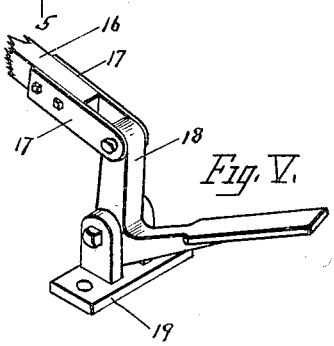
Witnesses:
W. A. Kirkpatrick
Mina M. Foster
Inventor
Clyde Preston Wagner

UNITED STATES PATENT OFFICE.

CLYDE P. WAGNER, OF JOPLIN, MISSOURI, ASSIGNOR OF ONE-HALF TO OVERTON H. GENTRY, OF JOPLIN, MISSOURI.

FLOUR-SPRINKLER.

1,128,559.   Specification of Letters Patent.   Patented Feb. 16, 1915.

Application filed February 12, 1914.   Serial No. 818,422.

*To all whom it may concern:*

Be it known that I, CLYDE P. WAGNER, a citizen of the United States of America, residing at Joplin, in the county of Jasper and State of Missouri, have invented certain new and useful Improvements in Flour-Sprinklers, of which the following is a specification.

The present invention relates to improvements in flour sprinklers and is designed especially as a device for sprinkling flour in an even and uniform coating, over any desired surface, although hereinafter described in connection with a dough brake or roller. In many cases it is customary to apply the flour, during the working of the dough through the brake, by hand, taking the flour from a receptacle located conveniently at one side of the machine. A great deal of flour is wasted in this manner, and the flour is not uniformly and evenly distributed and necessitates sweeping the surface of the dough by hand of the operator, which frequently results in the operator having his hand caught between the rollers. By the utilization of my device, these objectionable features are eliminated, the surface is uniformly and evenly coated, both material and time are economized, and further the device provides an efficient and facile instrumentality for performing its functions.

In the accompanying drawings I have illustrated one complete example of the physical embodiment of my invention constructed according to the best mode I have so far devised for the practical application of the principles of my invention.

Figure 1 is a perspective view of a flour sprinkler embodying the invention. Fig. 2 is a side elevation of the flour sprinkler. Fig. 3 is an enlarged transverse sectional view on line A—A of Fig. 2. Fig. 4 is an enlarged perspective view of the joint between the connecting link and operating link. Fig. 5 shows the treadle joint with the connecting link.

In the preferred embodiment of my invention as illustrated in the drawings I utilize a flour box rectangular in shape and comprising the sides 1, 1, a screen bottom 2 and end boards 3, 3. This box is of suitable dimensions and depth and is adapted to be reciprocated to shake or agitate the flour therein and sprinkle it through the screen bottom. To guide the flour box in its reciprocation I provide the sideboards 4 and bottom strips 5, 5, the former to prevent lateral movement of the box and the latter to provide a support for the box to slide upon. The guide boards and supporting strips are suspended by means of a plurality of posts 6, 6, attached to a suitable overhead member, and these posts are joined by transverse or cross bars 7 which, together with the obliquely extending rear bars 8 and cross bar 9, form the supporting frame for the box to move in. A spring 10 is attached to the forward end of the box, and at 11 is attached to the cross bar 9 by means of a thumb nut so that the tension of the spring may be increased or diminished as seems desirable, to govern and regulate the movement of the flour box. At the rear of the frame and extending from one side board 4 to the other, a stop bar 12 is attached. This bar serves as a stop for the rearward movement of the box, but in addition, it also imparts a jar to the box to assist in shaking the flour contained therein to sprinkle it through the screen bottom. The mechanism for imparting the reciprocating movement to the flour box includes a bolt 13 attached at the rear end of the box and fixed to the upright operating link 14, which is pivoted at 25 to a platform or floor upon which the machine is supported.

By means of the hinge joint 15 a connecting link 16 is pivoted to the operating link, and at 17 the connecting link is pivoted to the treadle 18 that is pivoted in the bracket 19 fixed to the floor or supporting platform.

A section of fabric 20 is suspended from the side boards 4 and extends downward at each side thereof to the brake hopper 21, to retain the flour and prevent it falling outside of the hopper. It will be noted that the fabric at the near side of Fig. 1 has been omitted in the interest of convenient illustration, and for the same purpose both fabrics have been omitted from Fig. 2.

The dough rollers are indicated by the numbers 22 and 23, and 24 indicates the platform for receiving the dough after it passes through the rollers.

Before the dough is thrown into the hopper 21, a coating of flour must be sprinkled over the bottom of hopper or trough to prevent the dough sticking. The dough is then thrown into the trough and another coating is then applied to the top of the dough to prevent sticking to the rollers 22 23 between which it is to be compressed into a sheet.

The flour sprinkler is actuated by pressure on the foot piece of the treadle 18, and through the connections with the connecting link and operating link, the box is moved to the right in Figs. 1 and 2. When pressure is released from the treadle, the spring 10 returns the box pulling it to the left in Figs. 1 and 2. The box is bumped against the cross bar 12 and the contents are agitated and shaken, so that a continuation of the treadle movement and spring movement in alternation causes the box to be reciprocated and the flour is uniformly and evenly distributed through the screen bottom of the box.

I claim:—

The combination with a supporting frame having side-guide and bottom strips, of a sprinkling box with a screen bottom, a cross bar in the frame, a spring attached thereto and connected to the box, a stop bar in the frame, and means for moving the box against the tension of the spring.

In testimony whereof I affix my signature in presence of two witnesses.

CLYDE P. WAGNER.

Witnesses:
MYRTLE E. WATERMAN,
JOHN W. NEWTON.

Copies of this patent may be obtained for five cents each, by addressing the "Commissioner of Patents, Washington, D. C."